US009876215B2

(12) United States Patent
Loo et al.

(10) Patent No.: US 9,876,215 B2
(45) Date of Patent: Jan. 23, 2018

(54) ELECTRIC CONNECTOR ATTACHMENT STRUCTURE OF BATTERY PACK FOR ELECTRIC VEHICLE

(71) Applicant: Mitsubishi Jidosha Kogyo Kabushiki Kaisha, Tokyo (JP)

(72) Inventors: Weng Leong Loo, Tokyo (JP); Seiichi Takasaki, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 174 days.

(21) Appl. No.: 14/594,311

(22) Filed: Jan. 12, 2015

(65) Prior Publication Data
US 2015/0243956 A1    Aug. 27, 2015

(30) Foreign Application Priority Data

Feb. 27, 2014    (JP) .................................. 2014-036584

(51) Int. Cl.
| H01M 2/10 | (2006.01) |
| H01M 2/30 | (2006.01) |
| B60L 11/18 | (2006.01) |

(52) U.S. Cl.
CPC ......... *H01M 2/305* (2013.01); *B60L 11/1818* (2013.01); *B60L 11/1877* (2013.01);
(Continued)

(58) Field of Classification Search
CPC ........ H01M 2/305; H01M 2/30; H01M 2/307; H01M 2/1083; H01M 2/00;
(Continued)

(56) References Cited

U.S. PATENT DOCUMENTS

| 2013/0257374 A1* | 10/2013 | Ichikawa | ............ | B60L 11/1809 320/109 |
| 2013/0280572 A1* | 10/2013 | Kawatani | ............ | H01M 2/1083 429/100 |

FOREIGN PATENT DOCUMENTS

| CN | 102602269 A | 7/2012 |
| EP | 2280436 A2 | 2/2011 |

(Continued)

*Primary Examiner* — Stephen Yanchuk
(74) *Attorney, Agent, or Firm* — Birch, Stewart, Kolasch & Birch, LLP (57) ABSTRACT

To provide an electric-connector attachment structure of a battery pack for an electric vehicle, which can attach an electric connector to a battery pack even when the height of the battery pack for an electric-vehicle is set low, the electric-connector attachment structure includes: a battery pack 3 for an electric vehicle including a tray 4 of a box-like shape which accommodates a battery and has an opening on an upper side, and a cover 5 of a box-like shape having an opening on a lower side, the tray 4 and the cover 5 being joined at a horizontal plane; and an electric connector 6 to which an electrical cable 61 is connected. It further includes an inclined portion 441, 551 to which the electric connector 6 is connected, disposed at an inner side of the battery pack 3 with respect to a joint surface 461 at which the tray 4 and the cover 5 are joined, extending over lower and upper regions across the horizontal plane H passing through the joint surface 461; and a protruding portion 443, 553 disposed between the joint surface 461 and the inclined portion 441, 551 so as to protrude from the horizontal plane passing through the joint surface 461 in a direction opposite to the electric connector 6. The inclined portion 441, 551 is formed so as to be continuous from the protruding portion 443, 551.

5 Claims, 5 Drawing Sheets (52) U.S. Cl.
CPC ....... *B60L 11/1879* (2013.01); *H01M 2/1083* (2013.01); *H01M 2220/20* (2013.01); *Y02T 10/705* (2013.01); *Y02T 10/7005* (2013.01); *Y02T 10/7072* (2013.01); *Y02T 90/14* (2013.01)

(58) Field of Classification Search
CPC ............ H01M 2220/20; B60L 11/1877; B60L 11/1818; B60L 11/1879
See application file for complete search history.

(56) References Cited

FOREIGN PATENT DOCUMENTS

| | | |
|---|---|---|
| EP | 2479818 A1 | 7/2012 |
| EP | 2626232 A2 | 8/2013 |
| JP | 2013-251111 A | 12/2013 |
| WO | WO2012/028929 * | 11/2011 |

* cited by examiner

ELECTRIC CONNECTOR ATTACHMENT STRUCTURE OF BATTERY PACK FOR ELECTRIC VEHICLE

TECHNICAL FIELD

The present disclosure relates to an electric-connector attachment structure of a battery pack for an electric vehicle, and more specifically, to an attachment structure that can attach an electric connector even in a case where the height of a battery pack for an electric vehicle is sot low.

BACKGROUND

A battery pack for an electric vehicle is to supply electric power to an electric drive mounted on an electric vehicle, and is disposed in a lower region of a floor panel. The battery pack includes a tray and a cover. An electric connector (charge connector) for charging a battery pack with electric power and an electric connector (supply connector) for supplying electric power to an electric drive from the battery pack are attached to a lateral face of the tray.

Meanwhile, the size of each electric connector (the charge connector and the supply connector) is determined depending on the electric capacitance of the electric power flowing through the electric connector. Thus, the size of the electric connector cannot be reduced unless the electric capacitance of the electric power flowing through the electric connector decreases. As a result, the height of the battery pack is set in accordance with the restriction of the ground clearance or the compartment space of the electric vehicle. In a case where the height of the tray is smaller than the attachment width of the electric connector, an inclined portion is provided on the outer peripheral wall of the tray and the electric connector is attached to the inclined portion, as described in Patent Document 1 (Japanese Unexamined Patent application No. 2013-251111), for example.

SUMMARY

However, especially in a case of a sporty electric vehicle or a small-sized electric vehicle, the ground clearance tends to be set low, which further restricts the installation space of the battery pack. In consequence, the height of the battery pack is also set low. In this case, while it is possible to attach the electric connector to the tray by reducing the inclination angle of the inclined portion, the electrical cable connected to the electric connector is then connected to a lower part of the tray, which requires modifying the arrangement of electric devices and setting the length of the electrical cable longer. Further, when the inclination angle of the inclined portion is reduced, the area of the tray occupied by the inclined portion increases, which reduces the capacity (volume) of the tray and requires increasing the size of the tray in a vehicle front-rear direction or a vehicle width direction.

In view of the above issues, an object of at least one embodiment of the present invention is to provide an attachment structure of a battery pack for an electric vehicle, that can attach an electric connector to the battery pack even in a case where the ground clearance of the electric vehicle is set low and the height of the battery pack is set low.

At least one embodiment of the present invention provides an electric-connector attachment structure of a battery pack for an electric vehicle, including: a battery pack for an electric vehicle including a tray of a box-like shape which accommodates a battery and has an opening on an upper side, and a cover of a box-like shape having an opening on a lower side, the tray and the cover being joined to each other at a horizontal plane; and an electric connector to which an electrical cable is connected. The electrical cable is connected to the battery pack to supply electric power to the battery pack from outside or to supply electric power to the outside from the battery pack. An outer peripheral wall of one of the tray and the cover includes: an inclined portion to which the electric connector is attached, the inclined portion being disposed at an inner side of the battery pack with respect to a joint surface at which the tray and the cover are joined to each other, and extending over a lower region and an upper region across the horizontal plane passing through the joint surface; and a protruding portion disposed between the joint surface and the inclined portion so as to protrude from the horizontal plane passing through the joint surface in a direction opposite to the electric connector. The inclined portion is formed so as to be continuous from the protruding portion.

According to the above configuration, the electric-connector attachment structure includes the inclined portion and the protruding portion. The inclined portion is disposed at the inner side of the battery pack with respect to the joint surface at which the tray and the cover are joined to each other. The inclined portion extends over the lower region and the upper region across the horizontal plane passing through the joint surface. The electric connector is connected to the inclined portion. The protruding portion is disposed between the joint surface and the inclined portion so as to protrude from the horizontal plane passing through the joint surface in the opposite direction to the electric connector. The inclined portion is formed so as to be continuous from the protruding portion. In this way, it is possible to attach the electric connector to the battery pack without reducing the inclination angle of the inclined portion, i.e., without reducing the angle θ in the direction of the inclination plane of the inclined portion with respect to the horizontal plane passing through the joint surface, or laying the inclined portion flat toward the horizontal plane side, even when the ground clearance of the electric vehicle is set low and the height of the battery pack is set low.

In one embodiment of the present invention, the joint surface comprises an upper surface of a tray-flange section protruding outwardly from the opening of the tray, and a lower surface of a cover-flange section protruding outwardly from the opening of the cover and being joined to the upper surface of the tray-flange section.

With the flange sections protruding outwardly as described above, it is possible to ensure that the joint surface has a sufficient width to enhance the dust-proof performance and water-proof performance between the tray and the cover.

In one embodiment of the present invention, the outer peripheral wall of the one of the tray and the cover includes facing portions disposed on both sides of the electric connector so as to face each other in a horizontal direction. The facing portions are formed no as to be continuous from the inclined portion.

In this way, the facing portions protect both sides of the electric connector, which makes it possible to protect the electric connector even in the event of collision of the electric vehicle.

In one embodiment of the present invention, the inclined portion is disposed on the outer peripheral wall of the tray.

In this way, it is unnecessary to ensure that the electrical cable connecting the battery and the electric connector inside the battery pack has a length sufficient to open and close the cover, unlike the case where the inclined portion is disposed on the cover. Thus, it is no longer necessary to provide a space for accommodating the electrical cable secured only to open and close the cover inside the battery pack, which makes it possible to prevent an increase in size of the battery pack.

In one embodiment of the present invention, the inclined portion is disposed on the outer peripheral wall of the cover.

In this way, it is possible to attach the electric connector to the inclined portion of the cover even in a case where the height of the battery pack is set low.

As described above, according to at least one embodiment of the present invention, it is possible to attach the electric connector to the battery pack without reducing the inclination angle of the inclined portion even in a case where the ground clearance of the electric vehicle is set low and the height of the battery pack is set low.

DETAILED DESCRIPTION

An electric-connector attachment structure of a battery pack for an electric vehicle according to one embodiment of the present invention will be described in detail referring to the accompanying drawings. The invention is not limited to the embodiment described below.

Figure 1:
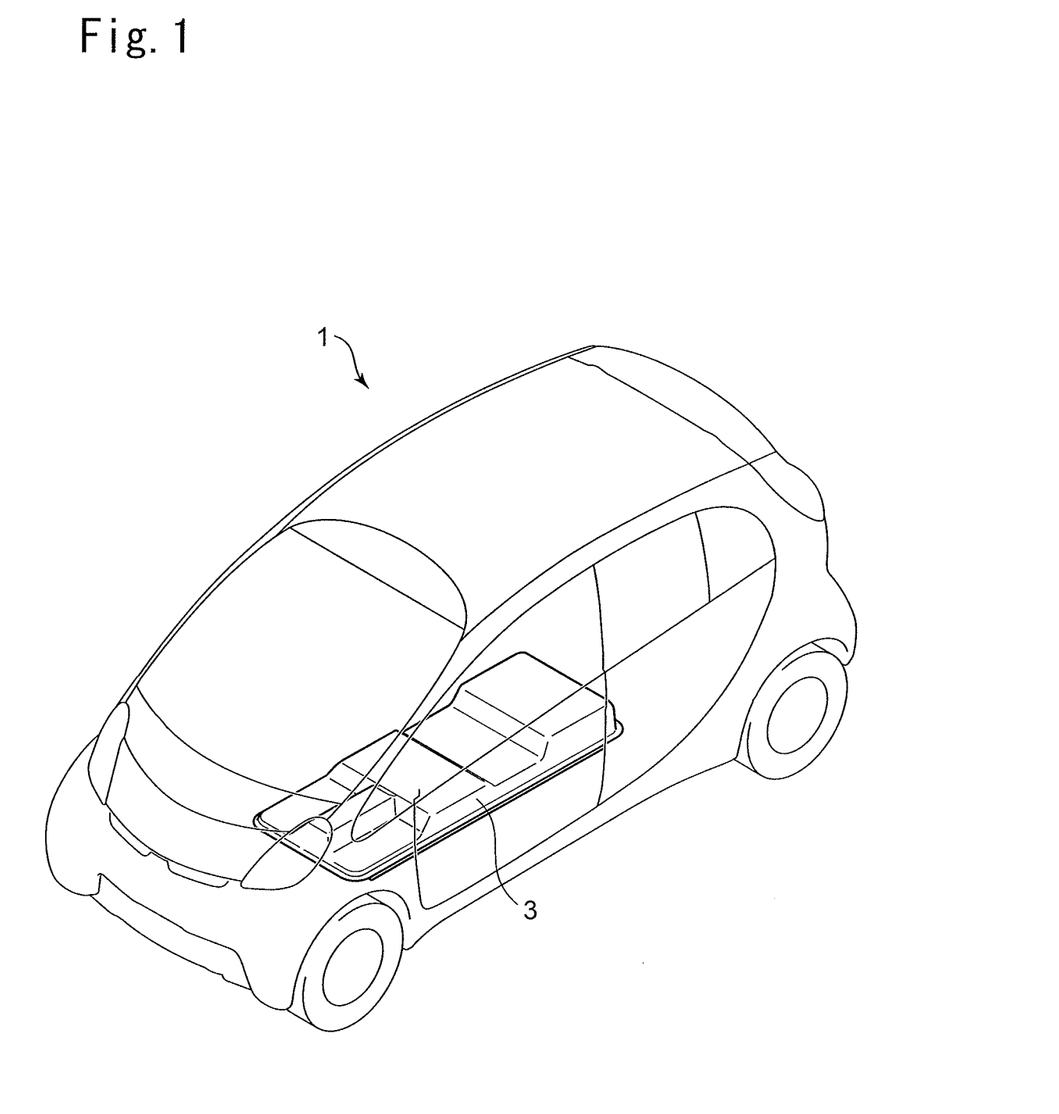
FIG. 1 is a schematic perspective view of an electric vehicle equipped with an electric-connector attachment structure or a battery pack for an electric vehicle according to an embodiment of the present invention.

FIG. 1 is a schematic diagram of an electric vehicle equipped with an electric-connector attachment structure of a battery pack for an electric vehicle according to an embodiment of the present invention. Hereinafter, an electric-connector attachment structure of a battery pack for an electric vehicle mounted to a small-size electric vehicle will be described as an example. The present invention, however, is not limited to this and is applicable to general electric vehicles including sporty electric vehicles.

As illustrated in FIG. 1, an electric-connector attachment structure of a battery pack for an electric vehicle according to an embodiment of the present invention is to supply electric power to an electric drive (power unit, not illustrated) mounted on an electric vehicle 1, and includes a battery pack 3 and electric connectors 6, 7 (see FIG. 4) attached to the battery pack 3.

Figure 4:
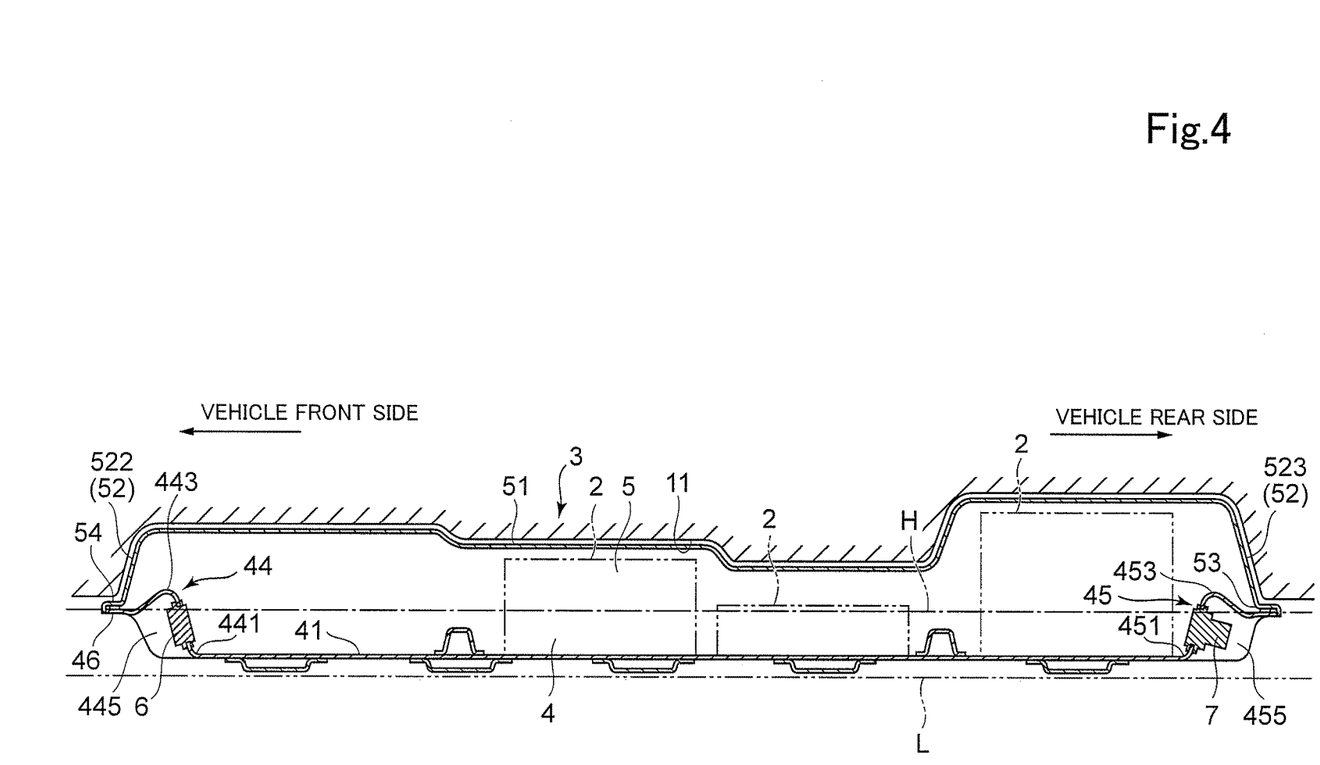
FIG. 4 is a cross-sectional view of FIG. 2 taken along line IV-IV.

The battery pack 3 is disposed in a lower region of a floor panel 11 (see FIG. 4). Electric power is supplied to the battery pack 3 from a quick charging port (not illustrated) disposed on the vehicle rear-lateral side through the electric connector 7. Electric power having been supplied to an on-board charger (not illustrated) from a regular charging port (not illustrated) disposed on the vehicle rear-lateral side is supplied to the battery pack 3 through the electric connector 7. In this way, the battery pack 3 is charged with electric power. Also, the battery pack 3 is connected to the power unit (not illustrated) including the electric drive such as a motor, a heater (not illustrated), an A/C compressor (not illustrated), or the like through the electric connectors 6, 7 so as to supply electric power thereto. As a result, electric power stored in the battery pack 3 is used.

Figure 2:
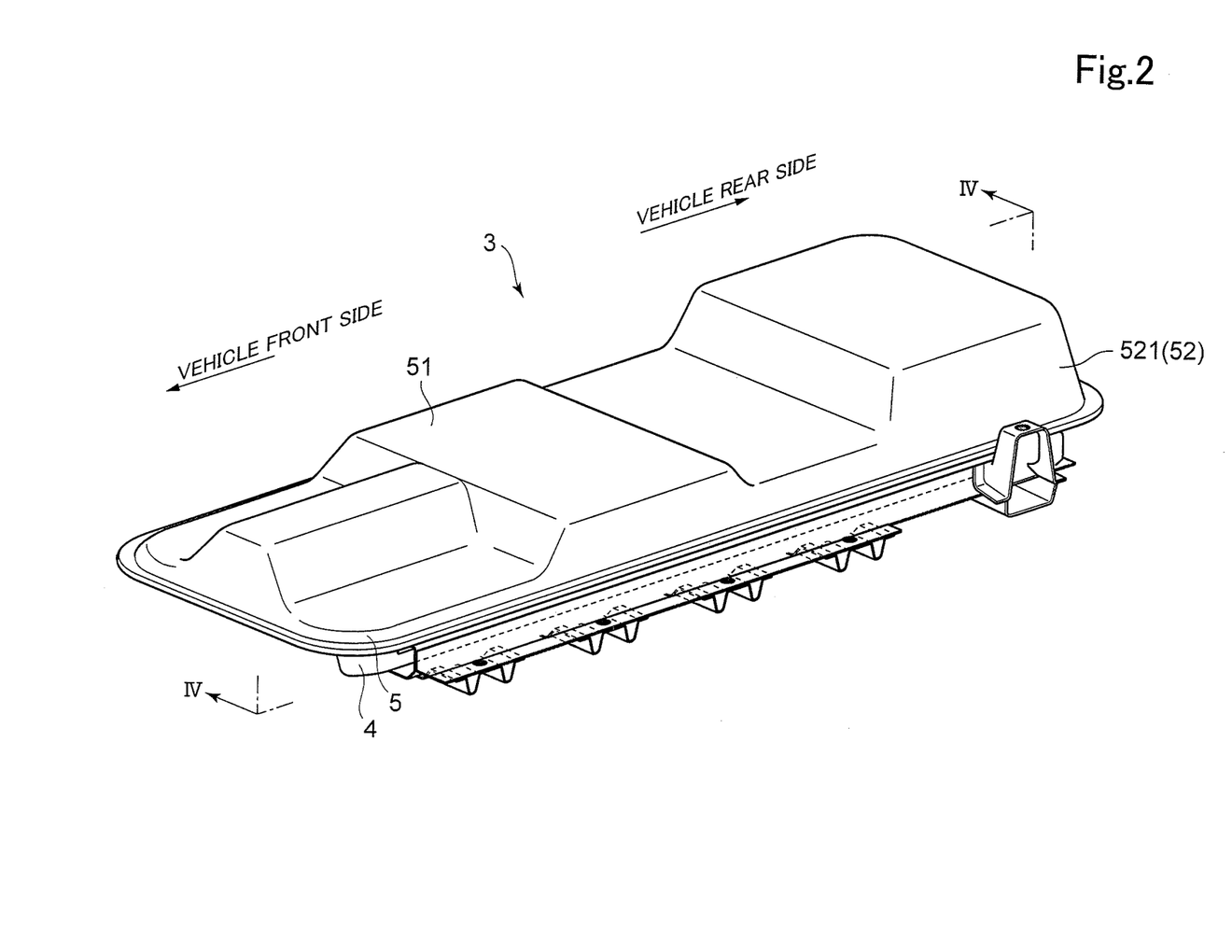
FIG. 2 is a perspective view of an external appearance of a battery pack illustrated in FIG. 1.
Figure 3:
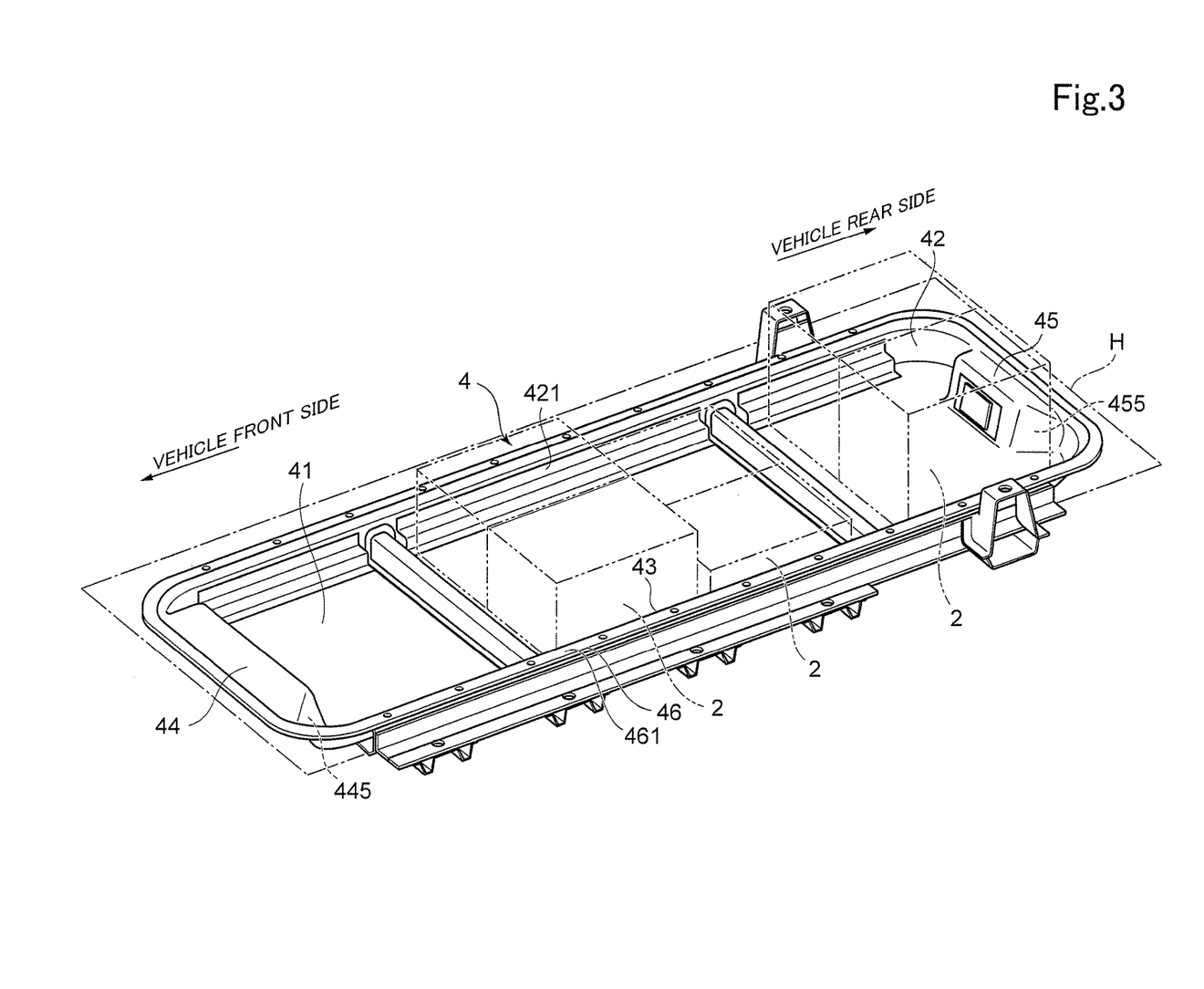
FIG. 3 is a perspective view of a tray illustrated in FIG. 2
Figure 5:
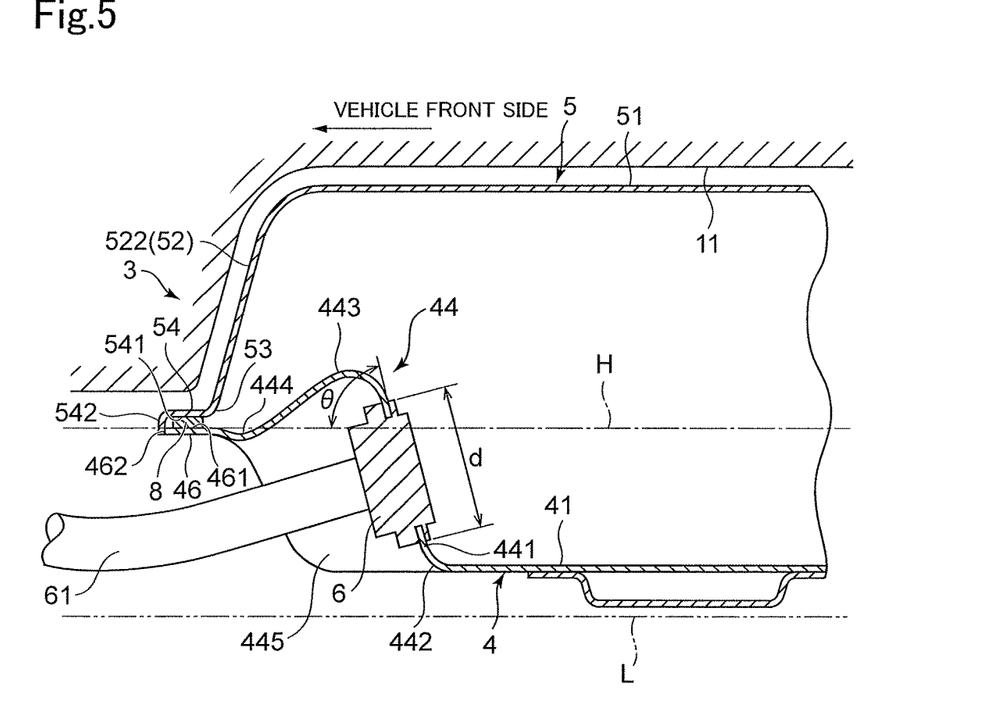
FIG. 5 is a partial cross-sectional view of the electric-connector attachment structure in FIG. 4.

FIG. 2 is a perspective view of an external appearance of a battery pack illustrated in FIG. 1. FIG. 3 is a perspective view of a tray illustrated in FIG. 2. FIG. 4 is a cross-sectional view taken along line IV-IV illustrated in FIG. 2. FIG. 5 is a partial cross-sectional view of the electric-connector attachment structure illustrated in FIG. 4.

As illustrated in FIG. 2, the battery pack 3 includes a tray 4 and a cover 5. The tray 4 and the cover 5 are joined to each other at a horizontal plane to constitute a box element.

As illustrated in FIG. 3, the tray 4 is to accommodate a battery 2 and has a shallow box-like shape having an opening 43 on an upper face. The bottom wall 41 of the tray 4 is formed in a rectangular shape elongated in the vehicle front-rear direction. An outer peripheral wall 42 is formed to surround the bottom wall 41. The outer peripheral wall 42 spreads gradually from the bottom wall 41 toward the opening 43, so that the wall surface of a lateral wall 421 disposed in the vehicle width direction forms an inclined surface. A front connector-attachment section 44 to which the electric connector 6 is attached is disposed in a region of the outer peripheral wall 42 at the vehicle front side, while a rear connector-attachment section 45 to which the electric connector 7 is attached is disposed in a region of the outer peripheral wall 42 at the vehicle rear side.

Further, a tray-flange section 46 is disposed around the opening 43. The tray-flange section 46 is a section to which the cover 5 is joined, disposed over the entire periphery of the opening 43. The tray-flange section 46 protrudes outwardly from the opening 43, so that a horizontal joint surface 461 is formed on an upper surface of the tray-flange section 46.

As illustrated in FIG. 2, the cover 5 is formed in a box-like shape of a size substantially identical to the size of the tray 4. The cover 5 is slightly deeper than the tray 4, and has an opening 53 on a lower side. The top face 51 of the cover 5 is formed in a rectangular shape elongated in the vehicle front-rear direction, similarly to the tray 4. Further, the height direction of the cover 5 is formed corresponding to a compartment space provided inside the electric vehicle 1, more specifically, to the floor panel 11. In the present embodiment, the height direction of the cover 5 is formed to be high in the lower regions of the driver's seat, the front passenger's seat (front seat), and the rear seat, and to be low in regions in front of the lower regions.

An outer peripheral wall 52 is formed around the top face 51 of the cover 5. The outer peripheral wall 52 gradually spreads from the top face 51 toward the opening 53, so that the wall surfaces of lateral walls 521 provided in the vehicle width direction, the wall surface of a front wall 522 (see FIG. 4) provided on the vehicle front side, and the wall surface of a rear wall 523 (see FIG. 4) provided on the vehicle rear side have inclined surfaces.

Further, as illustrated in FIG. 4, a cover-flange section 54 is disposed around the opening 53. The cover-flange section 54 is a section joined with the tray 4 and disposed over the entire periphery of the opening 53. As illustrated in FIG. 5, the cover-flange section 54 protrudes outwardly from the opening 53, so that a horizontal joint surface 541 is formed on the lower surface of the cover-flange section 54. Also, a lip 542 extending toward a lower region of the horizontal joint surface 541 is formed on the edge of the horizontal joint surface 541.

As illustrated in FIGS. 3 and 4, the front connector attachment section 44 is disposed in the region at the vehicle front side of the outer peripheral wall 42 of the above tray 4, as described above. Also, the rear connector attachment section 45 is disposed in the region at the vehicle rear side of the outer peripheral wall 42 of the tray 4, as described above.

As illustrated in FIG. 4, the front connector attachment section 44 is to attach the electric connector 6 to the battery pack 3 and disposed at the center in the vehicle width direction in a region at the vehicle front side so as to be recessed toward the inner side of the tray 4 as illustrated in FIG. 3. As illustrated in FIG. 5, the front connector attachment section 44 includes an inclined portion 441, a connecting portion 442, a protruding portion 443, an introductory portion 444, and facing portions 445. The inclined portion 441, connecting portion 442, protruding portion 443, introductory portion 444, and facing portions 445 form a recessed shape.

The protruding portion 443 protrudes from the horizontal plane H passing through the joint surface 461 toward the cover 5 at the inner side of the tray 4 with respect to the joint surface 461. That is, the protruding portion 443 bulges from the horizontal plane H passing through the joint surface 461 toward the cover 5.

The inclined portion 441 is a portion to which the electric connector 6 is attached, disposed over the lower region and the upper region across the horizontal plane H passing through the joint surface 461. The inclined portion 441 has a predetermined length and a predetermined inclination. The predetermined length is set so as to be adequate for attachment of the electric connector 6 on the basis of the attachment width of the electric connector 6. The predetermined inclination is set in consideration of the relationship with an electric device to which an electrical cable 61 connected to the electric connector 6 is connected, such that the electrical cable 61 connected to the electric connector 6 is arranged above the minimum ground clearance L. For instance, the predetermined inclination, which is an angle θ formed between the horizontal surface passing through the joint surface and the inclined surface of the inclined portion 441, is set within the range of from 45° to 90°.

The connecting portion 442 is a portion which connects the bottom wall 41 and the lower end of the inclined portion 441 of the tray 4 and which forms a bend surface. The protruding portion 443 is a portion for securing an attachment area for the electric connector 6, forming a curved surface extending from the upper end of the inclined portion 441 toward the horizontal plane H passing through the joint surface 461. That is, the protruding portion 443 is formed so as to be continuous from the inclined portion 441. The introductory portion 444 is a portion extending from the tray-flange section 46 toward the protruding portion 443, disposed so as to be recessed slightly from the tray-flange section 46 toward the lower region of the horizontal plane H passing through the joint surface 461. The introductory portion 444 constitutes a part of the opening 43. The facing portions 445 are portions for protecting the electric connector 6 attached to the inclined portion 441. The facing portions 445 are formed on both sides of the inclined portion 441 so as to face each other in the horizontal direction across the electric connector 6. Besides the inclined portion 441, the facing portions 445 are connected to the connecting portion 442, the protruding portion 443, and the introductory portion 444.

The electric connector 6 is attached to the above inclined portion 441. The total number of electric connector 6 is not limited to one, and the heater and the A/C compressor disposed in the vehicle front region are each provided with one electric connector 6. To the electric connector 6 attached to the inclined portion 441 for the heater, an electrical cable 61 connected to the heater is connected, so that electric power stored in the battery pack 3 is supplied to the heater. Similarly, to the electric connector 6 attached to the inclined portion 441 for the A/C compressor, an electrical cable 61 connected to the A/C compressor is connected, so that electric power stored in the battery pack 3 is supplied to the A/C compressor.

Further, as illustrated in FIG. 4, the rear connector attachment section 45 is to attach the electric connector 7 to the battery pack 3, similarly to the front connector attachment section 44. As illustrated in FIG. 3, the rear connector attachment section 45 is disposed at the center in the vehicle width direction in a region at the vehicle rear side. Although not illustrated in detail, the rear connector attachment section 45 includes an inclined portion 451, a connecting portion, a protruding portion 453, an introductory portion, and facing portions 455, similarly to the above described front connector attachment section 44. The protruding portion 453 protrudes toward the cover 5 from the horizontal plane H passing through the joint surface 461 at the inner side of the tray 4 with respect to the joint surface 461. That is, the protruding portion 453 bulges toward the cover 5 from the horizontal plane H passing through the joint surface 461.

The inclined portion 451 is, similarly to the inclined portion 441 of the above described front connector attachment section 44, a portion to which the electric connector 7 is attached, disposed over the lower region and the upper region across the horizontal plane H passing through the joint surface 461. The inclined portion 451 has a predetermined length and a predetermined inclination. The predetermined length is set so as to be adequate for attachment of the electric connector 7 on the basis of the attachment width of the electric connector 7. The predetermined inclination is set in consideration of the relationship with an electric device to which an electrical cable (not illustrated) connected to the electric connector 7 is connected, such that the electrical cable connected to the electric connector 7 is arranged above the minimum ground clearance L. For instance, the predetermined inclination is set within the range of from 45° to 90°.

The connecting portion is a portion which connects the bottom wall 41 and the lower end of the inclined portion 451 of the tray 4 and which forms a bend surface. The protruding portion 453 is a portion for securing an attachment area for the electric connector 7, forming a curved surface extending from the upper end of the inclined portion 451 toward the horizontal plane H passing through the joint surface 461. That is, the protruding portion 453 is formed on as to be continuous from the inclined portion 451. The introductory portion extends from the tray-flange section 46 toward the protruding portion 453, being disposed so as to be recessed slightly from the tray-flange section 46 toward the lower region of the horizontal plane H passing through the joint surface 461. The introductory portion constitutes a part of the opening 43. The facing portions 455 are to protect the electric connector 7 attached to the inclined portion 451. The facing portions 455 are formed on both sides of the inclined portion 451 so as to face each other in the horizontal direction across the electric connector 7. Besides the inclined portion 451, the facing portions 455 are connected to the connecting portion, the protruding portion 453, and the introductory portion.

The electric connector 7 is attached to the above inclined portion 451. The total number of electric connector 7 is not limited to one. Thus, the quick charging port (not illustrated) disposed in the vehicle rear-lateral region, and the in-vehicle charger (not illustrated) disposed in the vehicle rear region, and the power unit (not illustrated) are each provided with one electric connector 7. To the electric connector 7 attached to the inclined portion for quick charging, an electrical cable (not illustrated) connected to the quick charging port is connected, so that electric power supplied from the quick charging port is supplied through the electrical cable and the electric connector 7 to be stored in the battery pack 3. Similarly, to the electric connector 7 attached to the inclined portion for the in-vehicle charger, an electrical cable connected to the in-vehicle charger is connected, so that electric power supplied to the in-vehicle charger from the vehicle rear-lateral region is supplied through the electrical cable and the electric connector 7 to be stored in the battery pack 3. Similarly, to the electric connector 7 attached to the inclined portion 451 for the power unit, an electrical cable connected to the power unit is connected, so that electric power stored in the battery pack 3 is supplied to the power unit.

Furthermore, as illustrated in FIG. 5, the battery pack 3 includes a gasket 8 disposed between the tray 4 and the cover 5. The gasket 8 is to fill a gap formed between the tray 4 and the cover 5. Specifically, the gasket 8 is disposed between the joint surface 461 formed on the upper surface of the tray-flange section 46 of the tray 4 and the joint surface 541 formed on the lower surface of the cover-flange section 54 of the cover 5. The gasket 8 includes an elastic body such as a rubber. The tray 4 and the cover 5 are fastened to each other by screws (not illustrated) or the like, so that the gasket 8 is compressed to deform, thereby filling the gap between the tray 4 and the cover 5.

According to the above described electric-connector attachment structure of a battery pack for an electric vehicle according to an embodiment of the present invention, the outer peripheral wall 42 of the tray 4 includes the inclined portion 441 disposed over the lower region and the upper region across the horizontal plane H passing through the joint surface 461, and the protruding portion 443 disposed between the inclined portion 441 and the joint surface 461 so as to protrude toward the cover 5 from the horizontal plane H passing through the joint surface 461. In this way, it is possible to attach the electric connector 6 to the inclined portion 441 even in a case where the height of the battery pack 3 is set low. In this case, the electrical cable 61 connected to the electric connector 6 is arranged above the minimum ground clearance L. Similarly, the outer peripheral wall 42 of the tray 4 includes the inclined portion 451 disposed over the lower region and the upper region across the horizontal plane H passing through the joint surface 461, and the protruding portion 453 disposed between the inclined portion 451 and the joint surface 461 so as to protrude toward the cover 5 from the horizontal plane H passing through the joint surface 461. In this way, it is possible to attach the electric connector 7 to the inclined portion 451 even in a case where the height of the battery pack 3 is set low. Also in this case, the electrical cable connected to the electric connector 7 is arranged above the minimum ground clearance L.

Further, the front connector-attachment section 44 having the inclined portion 441 to which the electric connector 6 is attached is disposed in a region which becomes the vehicle front side when the battery pack 3 is mounted to the electric vehicle 1. In this way, it is possible to easily supply electric power to the electrical devices such as the heater and the A/C compressor disposed on a position which becomes the front side of the electric vehicle 1. Similarly, the rear connector-attachment section 45 having the inclined portion 451 to which the electric, connector 7 is attached is disposed in a region which becomes the vehicle rear side when the battery pack 3 is mounted to the electric vehicle 1. In this way, it is possible to easily supply electric power from the quick charging port and the in-vehicle charging device disposed on the rear side of the electric vehicle 1. Also, it is possible to easily supply electric power to the electrical devices such as the power unit disposed on the rear side of the electric vehicle 1.

Further, the inclined portions 441, 451 are disposed on the outer peripheral wall 42 of the tray 4, which makes it unnecessary to secure a length to open and close the cover for the electrical cable connecting the battery and the electric connector inside the battery pack 3, unlike the case where an electric connector is attached to the outer peripheral wall 52 of the cover 5. As a result, it is no longer necessary to provide a space for accommodating the electrical cable which is secured only to open and close the cover inside the battery pack 3, which makes it possible to prevent the battery pack 3 from increasing in size.

Further, the horizontal joint surfaces 461, 541 for joining the tray 4 and the cover 5 are formed on the upper surface of the tray-flange section 46 protruding outwardly from the opening 43 of the tray 4 and on the upper surface of the cover-flange section 54 protruding outwardly from the opening 53 of the cover 5. Thus, adequate widths are secured on the joint surfaces 461, 541, which makes it possible to improve the dust-proof performance and water-proof performance between the tray 4 and the cover 5. Also, the lip 542 formed on the edge of the cover-flange section 54 of the cover 5 overlaps with the edge 462 of the tray-flange section 46 of the tray 4, which makes it possible to further improve the dust-proof performance and water-proof performance.

Further, the gasket 8 is disposed between the joint surface 461 formed on the upper surface of the tray-flange section 46 of the tray 4 and the joint surface 541 formed on the lower surface of the cover-flange section 54 of the cover 5, which makes it possible to further improve the dust-proof performance and water-proof performance between the tray 4 and the cover 5.

In a case where the gasket 8 is not interposed, the joint surface 461 coincides with the joint surface 541. In a case where the gasket 8 is interposed, the joint surface 461 and the joint surface 541 are formed separately from each other.

Further, the front connector attachment section 44 includes the facing portions 445 at both sides of the inclined portion 441. Thus, the facing portions 445 protect both sides of the electric connector 6 attached to the inclined portion 441, which makes it possible to protect the electric connector 6 even in the event of collision of the electric vehicle 1 at a lateral side. Similarly, the rear connector attachment section 45 also includes the facing portions 455 at both sides of the inclined portion 451. Thus, the facing portions 455 protect both sides of the electric connector 7 attached to the inclined portion 451, which makes it possible to protect the electric connector 7 even in the event of collision of the electric vehicle 1 at a lateral side.

Figure 6:
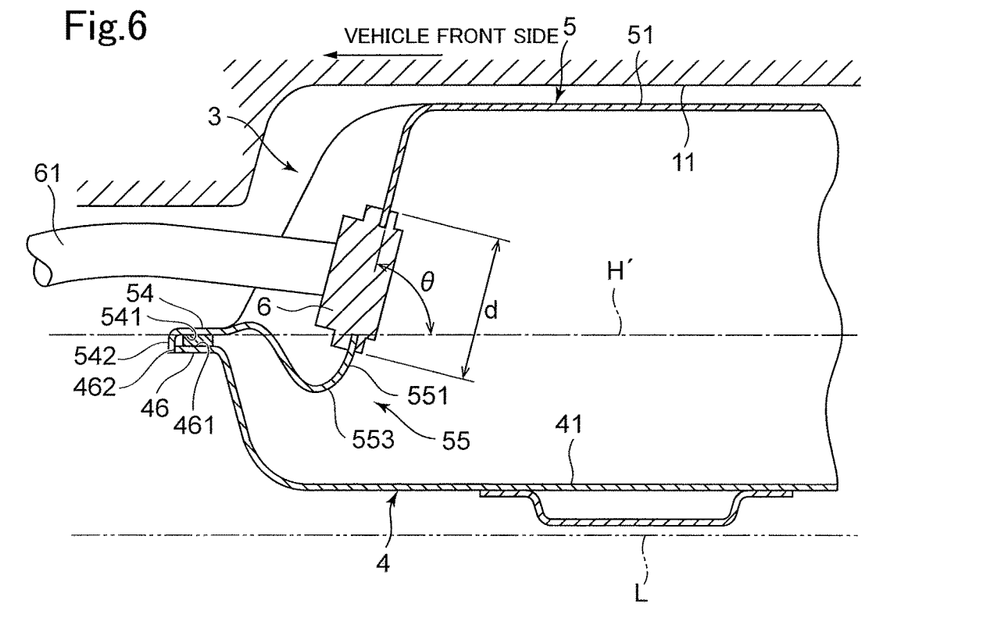
FIG. 6 is a diagram illustrating a modified example of an electric-connector attachment structure of a battery pack for an electric vehicle according to an embodiment of the present invention.

FIG. 6 is a diagram illustrating a modified example of an electric-connector attachment structure of a battery pack for an electric vehicle according to an embodiment of the present invention. As illustrated in FIG. 6, in the modified example, a connector attachment section 55 is disposed on the outer peripheral wall 52 of the cover 5. The connector attachment section 55 includes an inclined portion 551 and a protruding portion 553. The inclined portion 551 is disposed over the lower region and the upper region across the horizontal plane H' passing through the joint surface 541 at the inner side of the cover 5 with respect to the joint surface 541. The protruding portion 553 protrudes toward the tray 4 from the horizontal plane H passing through the joint surface 461, i.e., bulges toward the tray 4 from the horizontal plane H passing through the joint surface 461, at the inner side of the cover 5 with respect to the joint surface 461.

The electric-connector attachment structure of a battery pack for an electric vehicle according to the modified example includes the inclined portion 551 and the protruding portion 553 disposed on the outer peripheral wall 52 of the cover 5, which makes it possible to attach the electric connector 6 to the inclined portion 551 even in a case where the height of the battery pack 3 is set low. In this case, the electrical cable 61 connected to the electric connector 6 is arranged above the minimum ground clearance L.

In the above embodiment and the modified example, the protruding portions 443 (453, 553) are disposed so as to bulge toward the cover 5 or the tray 4 from the horizontal plane H passing through the joint surface 461 and to form a curved surface. However, the protruding portions 443 (453, 553) are not limited to this and may protrude so as to form a cornered portion.

Further, in the above embodiment and the modified example, the connector attachment sections 44, 45 to which the electric connectors 6, 7 are attached are disposed on both sides of the battery pack 3 in the vehicle front-rear direction. However, the connector attachment sections 44, 45 are not limited to this, and the present invention may be applied to a case where the connector attachment sections are disposed on the sides of the battery pack 3 in the vehicle width direction.

As described above, with the electric-connector attachment structure of a battery pack for an electric vehicle according to at least one embodiment of the present invention, it is possible to attach the electric connector to the battery pack without reducing the inclination angle of the inclined portion even in a case where the ground clearance of the electric vehicle is set low and the height of the battery pack is set low. Thus, the present invention is suitable for an electric-connector attachment structure of a battery pack for a sporty electric vehicle or a small-sized electric vehicle.

The invention claimed is:

1. An electric-connector attachment structure of a battery pack for an electric vehicle, comprising:
a battery pack for an electric vehicle, including a tray of a box-like shape which accommodates a battery and has an opening on an upper side, and a cover of a box-like shape having an opening on a lower side, the tray and the cover being joined to each other at a horizontal plane; and
an electric connector to which an electrical cable is connected, the electrical cable being connected to the battery pack to supply electric power to the battery pack from outside or to supply electric power to the outside from the battery pack,
wherein an outer peripheral wall of one of the tray and the cover has a recessed shape recessed toward an inner side of the battery pack with respect to a joint surface at which the tray and the cover are joined to each other, the recessed shape includes:
a protruding portion found so as to be continuous from the joint surface, the protruding portion being provided so as to protrude upward or downward from a height of the joint surface; and
an inclined portion to which the electric connector is attached, the inclined portion being formed so as to be continuous from the protruding portion and extending over a lower region of the height of the joint surface and an upper region of the height of the joint surface, the inclined portion being inclined with respect to the horizontal plane passing through the joint surface.

2. The electric-connector attachment structure of a battery pack for an electric vehicle according to claim 1, wherein the joint surface comprises an upper surface of a tray-flange section protruding outwardly from the opening of the tray, and a lower surface of a cover-flange section protruding outwardly from the opening of the cover and being joined to the upper surface of the tray-flange section.

3. The electric-connector attachment structure of a battery pack for an electric vehicle according to claim 1, wherein the outer peripheral wall of the one of the tray and the cover includes facing portions disposed on both sides of the electric connector so as to face each other in a horizontal direction, the facing portions being formed so as to be continuous from the inclined portion.

4. The electric-connector attachment structure of a battery pack for an electric vehicle according to claim 1, wherein the inclined portion is disposed on the outer peripheral wall of the tray.

5. The electric-connector attachment structure of a battery pack for an electric vehicle according to claim 1, wherein the inclined portion is disposed on the outer peripheral wall of the cover.

\* \* \* \* \*